Patented Feb. 19, 1929.

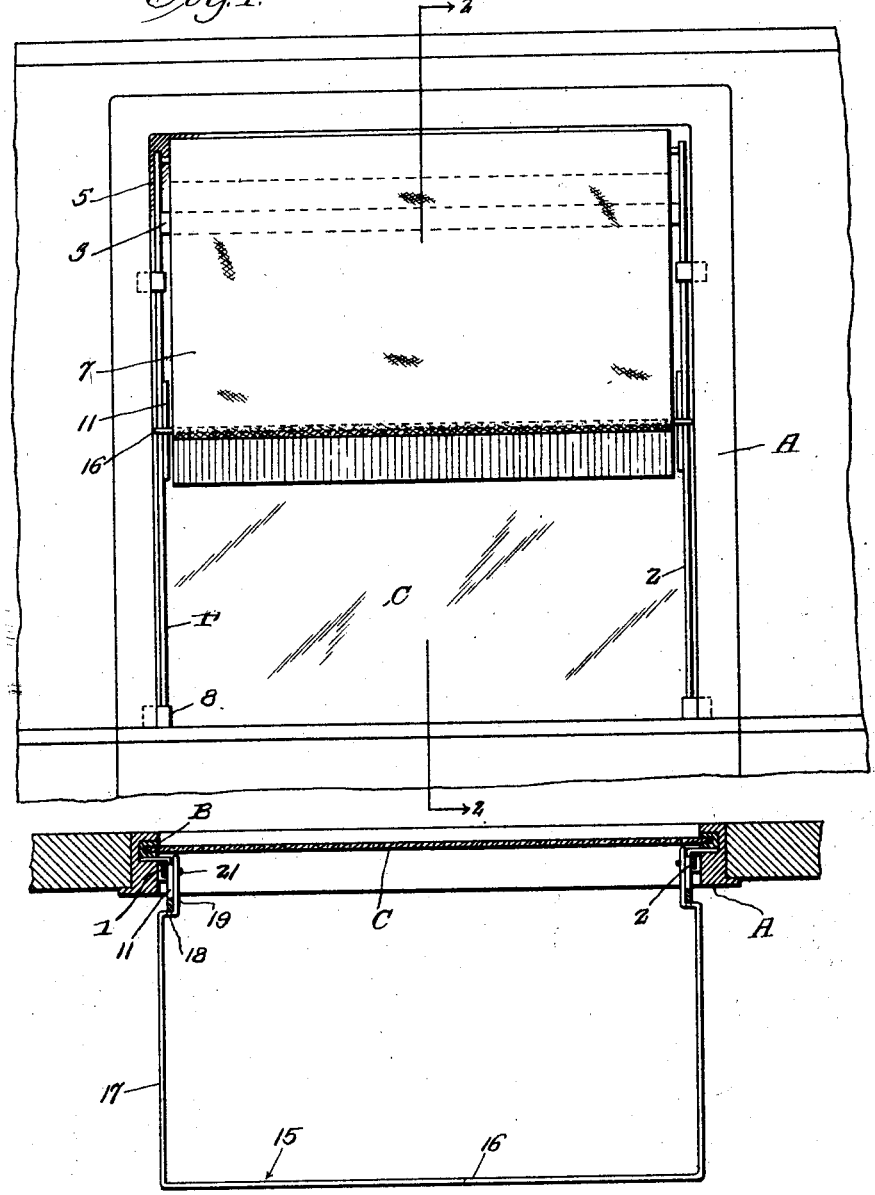

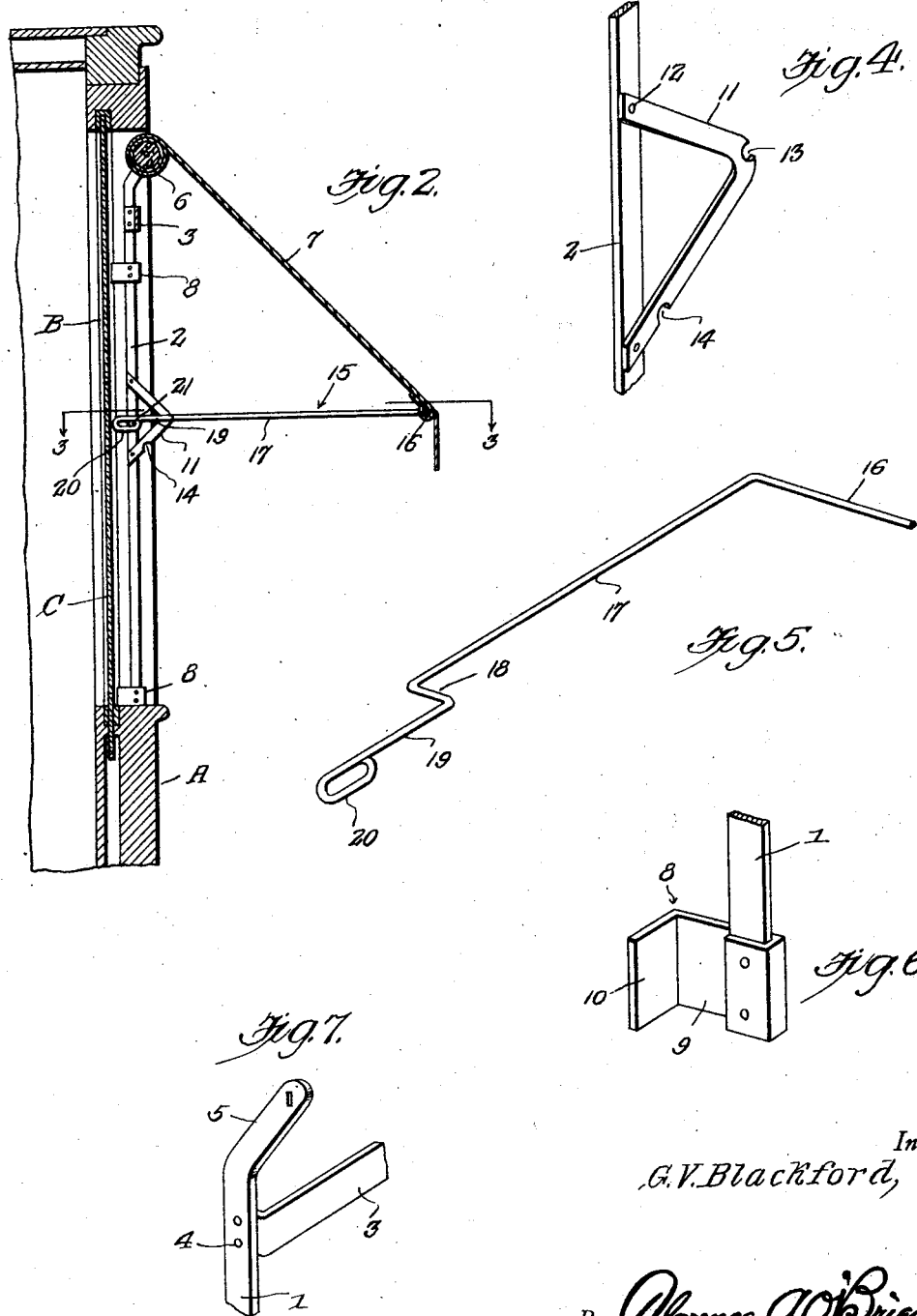

1,703,054

UNITED STATES PATENT OFFICE.

GILBERT V. BLACKFORD, OF INDEPENDENCE, KANSAS.

AWNING FOR AUTOMOBILE DOORS.

Application filed May 19, 1927. Serial No. 192,638.

The present invention relates to improvements in awnings for automobile doors and has reference more particularly to an improvement over my prior Patent No. 1,625,785, April 26, 1927.

One of the important objects of the present invention is to provide an awning construction for automobile doors wherein the same may be readily and easily placed in position in the window of an automobile door without necessitating any alterations of the parts of the window frame of the door with which the awning is to be associated.

A further object is to provide an awning construction of the above mentioned character which is simple in construction, inexpensive, and further well adapted to the purposes for which the same is designed.

Other objects and advantages of this invention will become apparent during the course of the following description.

In the accompanying drawings forming part of this specification and in which like numerals are employed to designate like parts throughout the same:

Figure 1 is a side elevation of the awning embodying my invention showing the manner in which the same is mounted in the window frame of an automobile door.

Figure 2 is a vertical sectional view taken substantially on the line 2—2 of Figure 1.

Figure 3 is a horizontal section taken on the line 3—3 of Figure 2 looking in the direction of the arrows.

Figure 4 is a detail perspective view of one of the V-shaped nose members carried by each of the vertical bars.

Figure 5 is a fragmentary detail perspective view of a portion of the U-shaped curtain frame showing the construction of one of the arms of the frame.

Figure 6 is a detail perspective view of one of the tongues carried by each of the vertical bars, and Figure 7 is a detail perspective view of the upper end portion of one of the vertical bars and the adjacent end portion of the connecting strip.

In the drawings wherein for the purpose of illustration is shown the preferred embodiment of my invention, the numerals 1 and 2 designate a pair of vertically disposed flat bars, the same being adapted for disposition within the window frame A of an automobile body of the closed type. These bars are disposed against the sides of the frame and are held together in proper spaced relation by means of the horizontally extending strip 3, the ends of which are disposed laterally and are secured to the upper end portions of the vertical bars in any appropriate manner such as is shown at 4 with reference more particularly to Figure 7 of the drawings. The upper end of each bar above the connecting strip 3 is disposed outwardly and upwardly as at 5. One of the offset portions 5 is formed with an opening while the other of said portions is provided with a vertical slot for receiving respectively the rounded and flat pintles at the opposite ends of a spring roller 6 whereby said spring roller will be disposed between the upper ends of the bars. Attached to this roller is one end of a flexible awning strip 7 and this spring roller is of comparatively the same construction as that set out in my prior patent.

The vertical bars 1 and 2 are maintained in proper position within the window frame A by means of the tongues 8. Two of these tongues are associated with each of the bars and each tongue comprises a flat elongated strip of metal which is bent at one end around each bar and is secured thereto in any appropriate manner. The free end portion of this strip extends beyond one edge of the bar as at 9 and is then disposed outwardly as at 10 with reference more particularly to Figure 6 of the drawings. The outwardly disposed end portions 10 of these tongues are adapted to fit into the channel formed in each side of the window frame between the felt B and the adjacent side of the channel in the manner as is very clearly shown in Figure 3. The felt being arranged within the channel for proper cooperation with the side edges of the sliding window pane C in the manner well known in the art. These tongues will properly support the bars in position in the window frame against accidental displacement therefrom and furthermore by disposing the upper ends of the bars outwardly as at 5, the spring roller 6 will not interfere with the entire closing of the window and this is clearly illustrated in Figure 2 of the drawings.

Carried by the intermediate portion of each of the bars is a substantially V-shaped nose member 11. The free ends of the arms of this V-shaped nose are secured to each of the bars either by rivets indicated at 12 or by welding the same to the bars. It is of course to be understood that I do not wish to limit myself to the particular manner in which these nose members may be associated with the vertical bars. The nose members project outwardly beyond the forward edges of the bars and a notch 13 is formed in the apex portion of each V-shaped nose. A similar notch 14 is formed in the lower edge of the lower arm of the V-shaped nose adjacent the end thereof in the manner as clearly shown in Figure 4 and the purpose of these notches will be presently described.

Also forming an important part of the present invention is the substantially U-shaped frame 15 formed from a single elongated piece of wire or rod and the outer end portion of the awning strip 7 is secured to the crown portion 16 of this U-shaped frame as clearly illustrated in Figure 2.

The inner free end portion of each arm 17 of the U-shaped frame 15 is bent laterally as at 18 and thence inwardly as at 19 and the free end portion of the inwardly directed end portion 19 is bent back upon itself to provide an elongated loop 20 and this construction is clearly illustrated in Figure 5 of the drawings.

A headed pin 21 extends inwardly from the inner side of each vertical bar through the respective loop 20 and the shoulder 18 is adapted for disposition over the outer edge of the respective V-shaped nose member 11.

The headed pin 21 cooperates with the looped portion 20 to provide a pivotal connection between the U-shaped frame 15 and the stationary bars 1 and 2 and manifestly by swinging the frame downwardly so that the same assumes a horizontal position, the curtain or awning strip 7 will be disposed in the position shown in Figure 2 and the shoulder 18 will be maintained in engagement with each of the notches 13 formed in the apex portion of each V-shaped nose member 11 and when the shoulders are in engagement with the notches 13, the pin 21 will be disposed in the forwardmost end of each loop 20 as clearly shown in Figure 2.

By pushing the frame 15 outwardly so that the shoulders 18 are moved out of engagement with the notches 13 and further swinging the frame downwardly until the shoulders are disposed adjacent the lower notches 14, it will be observed that when the frame 15 is moved inwardly, the shoulders 18 will engage the notches and the curtain or awning strip 7 will then be disposed in a substantially vertical position for further lowering the shade or awning.

The simplicity of my improved awning enables the parts to be readily and easily operated for adjusting the position of the awning strip and also the complete device may be easily and readily installed or removed without necessitating the removal of any of the parts of the window frame of the door with which the awning is associated.

While I have shown the preferred embodiment of my invention, it is to be understood that various changes in the size, shape and arrangement of parts may be resorted to without departing from the spirit or sacrificing any of the advantages of the appended claim.

What I claim is:

In a bracket, a vertical bar, a substantially V-shaped nose member projecting forwardly from the bar and formed with spaced notches, an arm, the inner end thereof being bent laterally to form a shoulder and thence inwardly for disposition against the inner side of the bar, the inner end portion of the inwardly disposed end being looped, a pin projecting from the inner side of the bar at a point diametrically opposite the apex portion of the V-shaped nose, said pin projecting through the loop whereby the arm is pivotally and slidably associated with the bar, said shoulder adapted for engagement with the notches for holding the pivoted arms in various adjusted positions with respect to the bar.

In testimony whereof I affix my signature.

GILBERT V. BLACKFORD.